US007058724B1

(12) United States Patent
Das et al.

(10) Patent No.: US 7,058,724 B1
(45) Date of Patent: Jun. 6, 2006

(54) ARRANGEMENT FOR ROUTING A RECEIVED SIGNALING MESSAGE BASED ON A SELECTED SUMMARY ROUTE IN AN SS7 NETWORK

(75) Inventors: Amitava Das, Chapel Hill, NC (US); Randal Latta Dunn, Cary, NC (US); Paul Aloysius Schmidt, Cary, NC (US); Uwe Sellentin, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 09/985,271

(22) Filed: Nov. 2, 2001

(51) Int. Cl.
*G06F 15/173* (2006.01)

(52) U.S. Cl. ........................ 709/238; 709/242; 709/223

(58) Field of Classification Search ................ 709/238, 709/230, 243, 242, 223
See application file for complete search history.

(56) References Cited

U.S. PATENT DOCUMENTS

| | | | |
|---|---|---|---|
| 5,481,673 A * | 1/1996 | Michelson ................ 709/242 |
| 5,708,702 A | 1/1998 | De Paul et al. |
| 5,812,639 A * | 9/1998 | Bartholomew et al. ...... 370/352 |
| 6,002,693 A * | 12/1999 | Hahn ........................ 370/466 |
| 6,052,683 A * | 4/2000 | Irwin ............................ 707/8 |
| 6,061,432 A | 5/2000 | Wallace et al. |
| 6,192,051 B1 * | 2/2001 | Lipman et al. .............. 370/389 |
| 6,223,172 B1 * | 4/2001 | Hunter et al. ................... 707/3 |
| 6,330,324 B1 * | 12/2001 | Sabinson et al. ....... 379/221.08 |
| 6,606,379 B1 * | 8/2003 | Khadri et al. ............ 379/221.1 |
| 2001/0002190 A1 * | 5/2001 | Yi ............................... 370/200 |
| 2003/0123459 A1 * | 7/2003 | Liao .......................... 370/401 |

* cited by examiner

*Primary Examiner*—Jason Cardone
*Assistant Examiner*—Nghi Tran
(74) *Attorney, Agent, or Firm*—Leon R. Turkevich (57) ABSTRACT

A signaling network node is configured for generating a routing decision based on selectively masking a point code field from a received SS7 signaling message. The received SS7 signaling message includes a header that includes a point code field having a prescribed bit length. The signaling network node searches its routing table to determine the presence of a matching full-length point code of the prescribed bit length that specifies a prescribed route for the received signaling message. If there is no matching full-length point code, the signaling network node generates a reduced point code by applying a user-selectable mask to the point code. The signaling network node then searches its routing table, based on the reduced point code, for a matching reduced-length point code that specifies a corresponding summary route. If desired different masks may be used until a matching reduced-length point code is located. The signaling network node, upon locating a matching reduced-length point code that matches the reduced point code, outputs the received signaling message based on the corresponding summary route.

44 Claims, 5 Drawing Sheets

ARRANGEMENT FOR ROUTING A RECEIVED SIGNALING MESSAGE BASED ON A SELECTED SUMMARY ROUTE IN AN SS7 NETWORK

BACKGROUND OF THE INVENTION

1. Field of the Invention

The present invention relates to routing a received Signaling System 7 (SS7) message in a Common Channel Interoffice Signaling (CCIS) network of a out-of-band telecommunications system.

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

As recognized in the art, the hardware and software operations of the SS7 protocol are divided into "layers", similar to the Open Systems Interconnect (OSI) Network Model specified by the International Standards Organization (ISO). The "lowest levels" of the SS7 protocol include the Message Transfer Part (MTP) Level 1, Level 2, and Level 3. MTP Level 1 and Level 2 are equivalent to the OSI Physical Layer and the OSI Data Link layer, respectively. MTP Level 3, equivalent to the OSI Network Layer, provides message routing between signaling points in the SS7 network, and re-routes traffic away from failed links and signaling points and controls traffic when congestion occurs.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

One type of signal unit, known as a Message Signal Unit (MSU), includes a routing label which allows an originating signaling point to send information to a destination signaling point across the network. The routing label includes an originating point code (OPC) specifying the originating signaling node, a destination point code (DPC) specifying the destination for the SS7 messaging packet, and a signaling link selection (SLS) field. Hence, the selection of outgoing link is based on information in the DPC and SLS.

The size of the point code may vary depending on protocol; for example, each North American point code according to the American National Standards Institute (ANSI) uses 24 bits, whereas each point code specified by the International Telecommunication Union (ITU) uses 14 bits. In particular, an ANSI point code specifies a network hierarchy based on network, cluster, and member octets (e.g., 245-16-0 decimal). An octet is an 8-bit (i.e., 1-byte) value which can contain any value between zero and 255. Telcos with large networks have unique network identifiers while smaller operators are assigned a unique cluster number within networks 1 through 4 (e.g., 1-123-9). Network number 0 is not used; network number 255 is reserved for future use.

ITU-T point codes are pure binary numbers which may be stated in terms of zone, area/network, and signaling point identification numbers. For example, the point code 5557 (decimal) may be stated as 2-182-5 (binary 010 10110110 101).

The STPs are program controlled packet data switching systems. In operation, an STP will receive a packet data message from another node of the network, for example from an end office switching system. The STP analyzes the point code information in the packet and routes the packet according to a static routing table, also referred to as a translation table, stored within the STP. Any packet having a particular point code is output on a port going to the next CCIS signaling node specified by translation of that point code. Hence, the routing table stores for each (24-bit or 14-bit) point code a corresponding port address for outputting the packet to a specified link set.

Figure 1:
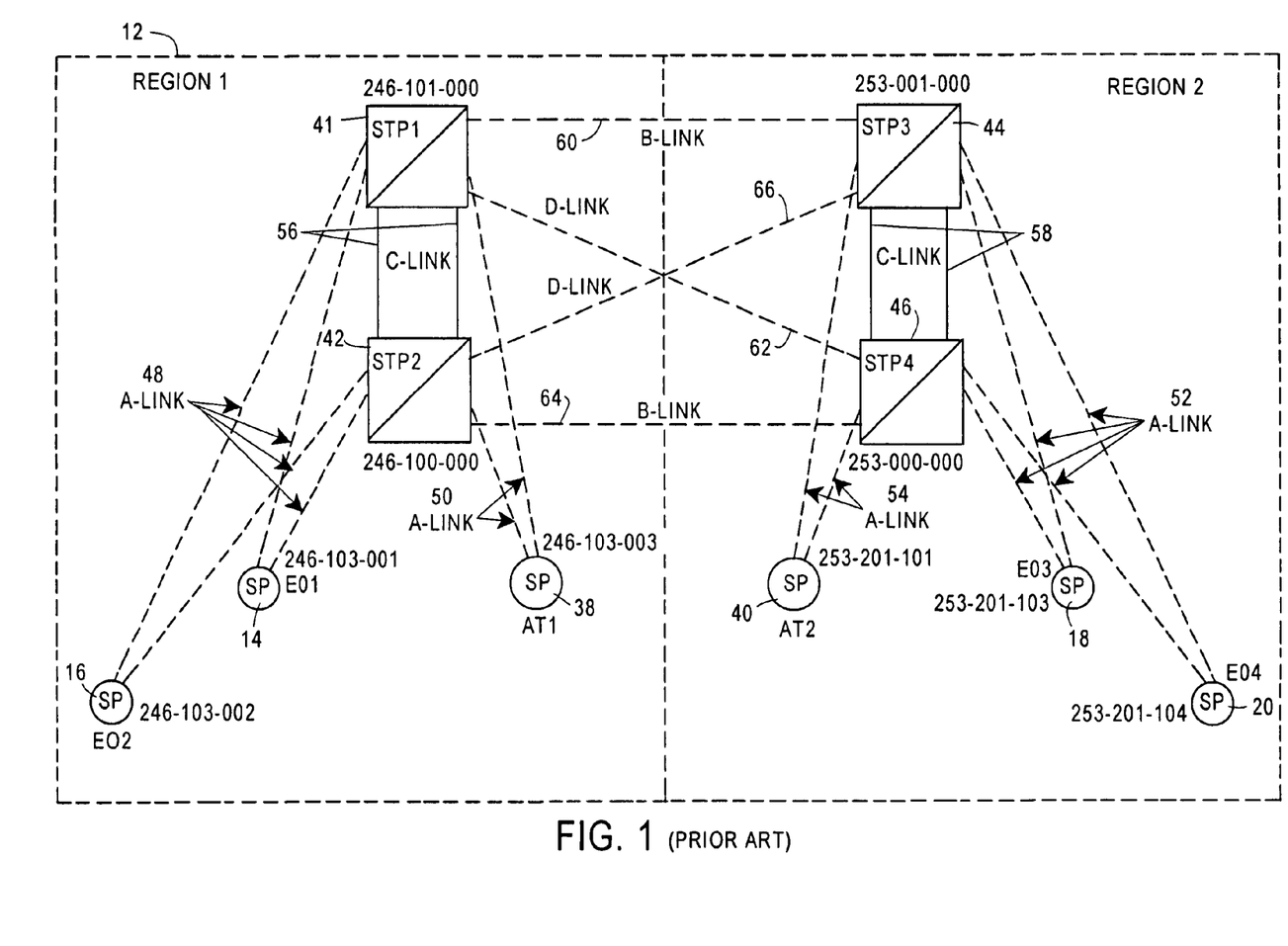
FIG. 1 is a block diagram illustrating a conventional (Prior Art) SS7 signaling system for a public switched telephone network.

FIG. 1 is a block diagram illustrating a public switched telephone network and the SS7 network that is used to control the signaling for the switched network. A switched telephone network has a common channel signaling network in the form of an SS7 network 12. The switched telephone network includes a series of central offices which are conventionally referred to as signaling points (SPs) in reference to the SS7 network. Certain of these SPs comprise end offices (EOs) illustrated at 14, 16, 18 and 20 as EOs 1–4 in FIG. 1. The EO may be a local or "end office" type switch.

Each signaling point has a point code comprising a 9-digit (24-bit) code assigned to every node in the SS7 network. For example, EO1 has a point code of 246-103-001, EO2 has a point code of 246-103-002, EO3 has a point code of 253-201-103, and EO4 has a point code of 253-201-104.

The end offices EO1 and EO2 represent end offices in the region of one regional operating company, while end offices EO3 and EO4 represent end offices of the region of a different operating company. The point code specifies a network ID, a number specifying a cluster, and a number specifying a member of the cluster (e.g., an SP). Specifically, each operating company has its own network ID, shown as 246 for Region 1 and 253 for Region 2. The number 103 in the designation 246-103-001, is the number of the cluster. An ANSI cluster can hold 255 SPs or members, the member being designated by the final 3 numbers. Thus 246 may represent C & P of Virginia Regional Operating Company, cluster 103, member EO2 for EO2 when viewed from an SS7 standpoint. The broken lines represent signaling links between the SPs; note that additional signaling links (not shown in FIG. 1) may be utilized for transporting signaling messages. Although not shown, the SPs are also connected by local trunks within a region and by inter-exchange carrier network (ICN) trunks across Access Tandems (ATs) 38 and 40 (AT1 and AT2). These SPs or ATs are shown as having point codes 246-103-003 and 253-201-101 respectively.

The SS7 network 12 comprises a series of Signal Transfer Points (STPs) shown at 41, 42, 44 and 46 designated STP1, STP2, STP3 and STP4, respectively. Each STP in a network is connected to the SPs in the network by A links indicated at 48, 50, 52 and 54. STP1 and STP2 constitute a mated pair of STPs connected by C links 56, while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair utilize the C links for redundancy to avoid loss of data. Therefore, unnecessary utilization of the C links causes congestion and interferes with the paired STPs efforts to back up data.

The SS7 network typically constitutes a highly redundant data network, generally a 56 K switched data circuit. By way of example, an SS7 message from EO2 to EO4 might travel any one of 8 possible routes. It could go from EO2 to STP1, from STP1 to STP3, STP3 to EO4. One variation on that route would be from STP 1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3–STP4 pair.

As apparent from the foregoing, the static nature of the routing table in the corresponding signaling point (e.g., the STP) limits the flexibility of the packet switching system due to the difficulty associated with modifying the routing table. A modification to the table, for example to route certain signaling messages through alternate links because a portion of the network is disabled, requires a substitution of the entire table relating to messages intended for the now disabled portion of the network.

Moreover, the prescribed grouping of point code bits to prescribed network groups according to ANSI or ITU protocol imposes strict implementation-dependent limitations in provisioning the point codes to respective signaling nodes. Hence, network operators are required to manually provision point codes according to network topologies that may not suit their needs.

The ANSI standard allows for, and specifies in detail, a form of routing referred to as Cluster Routing. A "cluster route" is a route to a point code of which only the Network and Cluster portions have been specified, i.e., the first 16 bits. Hence, the cluster route enables one to specify a route to all members within that cluster. Such cluster routing, however, still may not be convenient for a telco attempting to provision a network.

SUMMARY OF THE INVENTION

There is a need for an arrangement that enables signaling messages to be routed by a signaling network node based on a routing procedure configurable by a network designer. In particular, there is a need for an arrangement that enables a network designer to deploy a desired signaling network having signaling network nodes with respective assigned point codes, followed by provisioning routing tables without the necessity of provisioning each routing table to include all the assigned point codes.

There also is a need for an arrangement that enables signaling messages to be routed based on summary routes configured based on network topology selectable by the network designer.

There also is a need for an arrangement that enables a network designer to deploy, within a signaling network node configured for routing a signaling message, routing procedures having multiple hierarchal routes based on at least one of a prescribed condition detected within the signaling message and a detected network condition.

These and other needs are attained by the present invention, where a signaling network node is configured for generating a routing decision based on selectively masking a point code field from a received signaling message. The received signaling message includes a header that includes a point code field having a prescribed bit length. The signaling network node searches its routing table to determine the presence of a matching full-length point code of the prescribed bit length that specifies a prescribed route for the received signaling message. If there is no matching full-length point code, the signaling network node generates a reduced point code by applying a user-selectable mask to the point code. The signaling network node then searches its routing table, based on the reduced point code, for a matching reduced-length point code that specifies a corresponding summary route. If desired, different masks may be used until a matching reduced-length point code is located. The signaling network node, upon locating a matching reduced-length point code that matches the reduced point code, outputs the received signaling message based on the corresponding summary route.

Hence, network designers can configure signaling networks as desired using a combination of full-length point code routing and reduced point code routing, or a hierarchal array of reduced point code routing based on different masks. The use of reduced point codes enables network designers to generate summary routes based on the user-selectable network topology, eliminating the need for fully-populated full point code routing tables. Moreover, network designers can configure and provision signaling networks without the necessity of relying on deployments suggested by existing protocols such as ANSI or ITU—rather than relying on cluster routing, network designers can utilize near zero-length masks, where one or two bits of a point code can be utilized for routing decisions.

One aspect of the present invention provides a signaling network node configured for routing a received signaling message having a point code field specifying a full-length point code value of a prescribed bit length. The signaling network node includes a routing table configured for storing reduced point code entries, each reduced point code entry configured for storing a corresponding reduced point code, having selected bits masked relative to a full-length point code of the prescribed bit length, and a corresponding summary route. The signaling network node also includes a processor configured for selecting one of the entries of the routing table for routing the received signaling message. The processor is configured for selectively generating a reduced point code value based on a prescribed determined condition and based on applying a user-selectable mask to the full-length point code value, and selecting the one entry based on a match between the corresponding reduced point code and the reduced point code value.

Another aspect of the present invention provides a method in a signaling network node for routing a received signaling message having a point code field specifying a full-length point code value of a prescribed bit length. The method includes storing reduced point code entries in a routing table. Each reduced point code entry is configured for storing a corresponding reduced point code, having selected bits masked relative to a full-length point code of the prescribed bit length, and a corresponding summary route. The method also includes selectively generating a reduced point code value, based on a prescribed determined condition, based on applying a user-selectable mask to the full-length point code value, and selecting one of the entries of the routing table for routing the received signaling message, based on a match between the corresponding reduced point code and the reduced point code value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
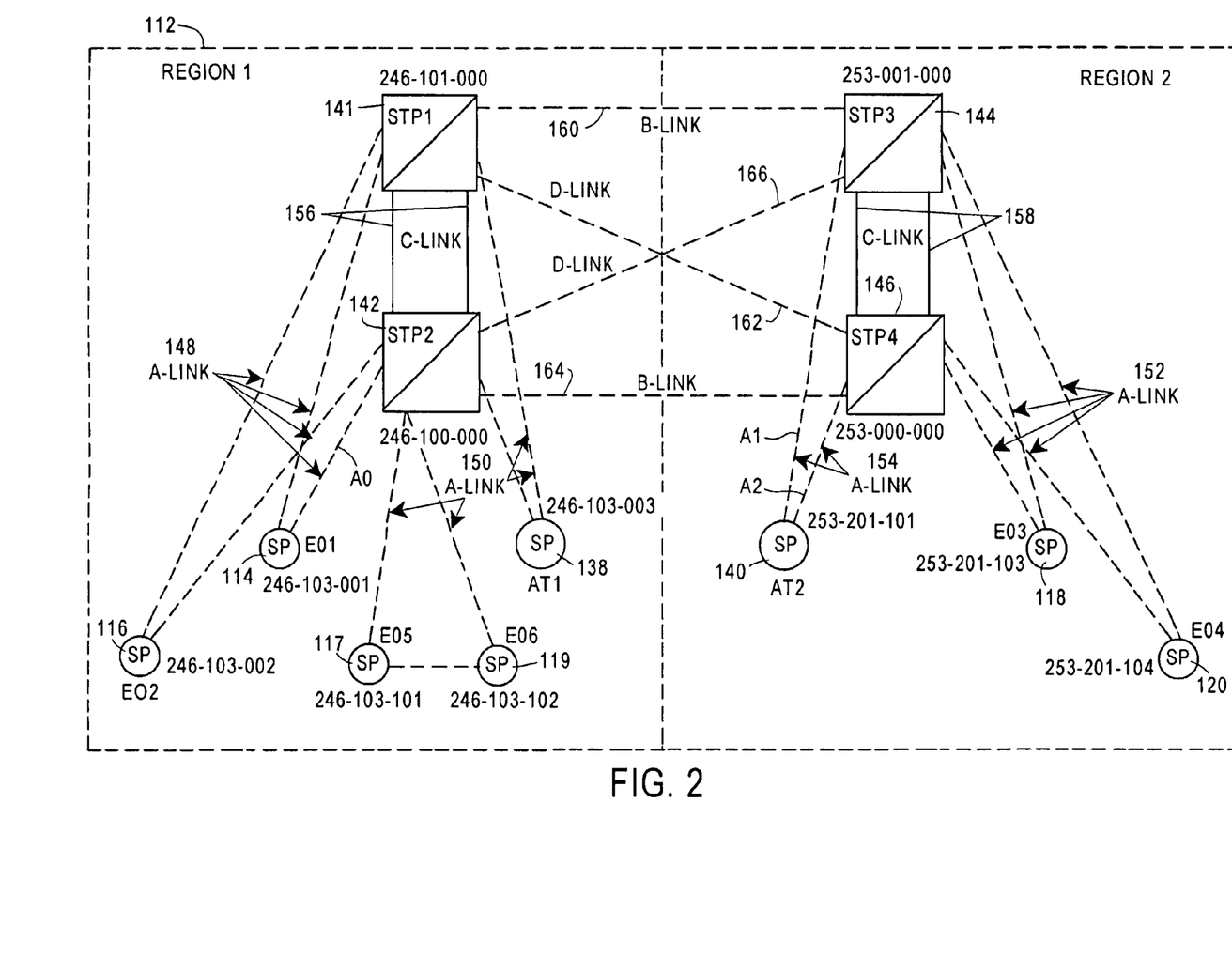
FIG. 2 is a diagram illustrating an SS7 signaling system implementing summary routing according to an embodiment of the present invention.

FIG. 2 is a block diagram illustrating an SS7 signaling system implementing summary routing, as described below with reference to FIGS. 3, 4A–4C, and 5, according to an embodiment of the present invention. As described below, summary routes are created within the routing tables of a signaling network node, where destinations can be specified with a granularity of one bit. A user-selectable mask is applied to the full-length point code value from a received signaling message to generate a reduced point code value. The reduced point code value can then be used to search within the routing table for a matching reduced point code entry that specifies a corresponding reduced point code and a corresponding summary route. Since the reduced point code has selected bits masked relative to the full length point code, a single table entry can be used to perform summary routing for multiple point code values. Hence, routing tables can be provisioned according to network designer preferences, without the necessity of populating a routing table with entries for each and every point code; rather, summary routes can be used to group destination point codes to summary routes.

FIG. 2 is a block diagram illustrating a public switched telephone network utilizing summary routes. In particular, the telephone network includes an SS7 network 112, including end offices 114, 116, 117, 118, 119, and 120. The network further includes ATs 138 and 140, and STPs 141, 142, 144, and 146. As described below, SS7 messages can be sent via A-links 148, 150, 152, and 154; B-links 160 and 164; C-links 156 and 158; D-links 162 and 166; other links (not shown) also may be utilized as desired.

Each signaling point has a point code, for example an ANSI 9-digit point code. For example, EO1 has a point code of 246-103-001, EO2 has a point code of 246-103-002, and AT1 has a point code of 246-103-003. Note that EO5 has a point code of 246-103-101, and EO6 has a point code of 246-103-102.

In contrast to the arrangement illustrated in FIG. 1, assume that the designers of the network 112 prefer to reconfigure a network, for example to eliminate the use of certain links or to redirect traffic. Conventional prior art techniques would require manually provisioning each of the destination point codes in each of the signaling points, resulting in costly provisioning management. However, use of summary routing according to the disclosed embodiment simplifies the manner in which designers can implement the network.

Figure 4A:
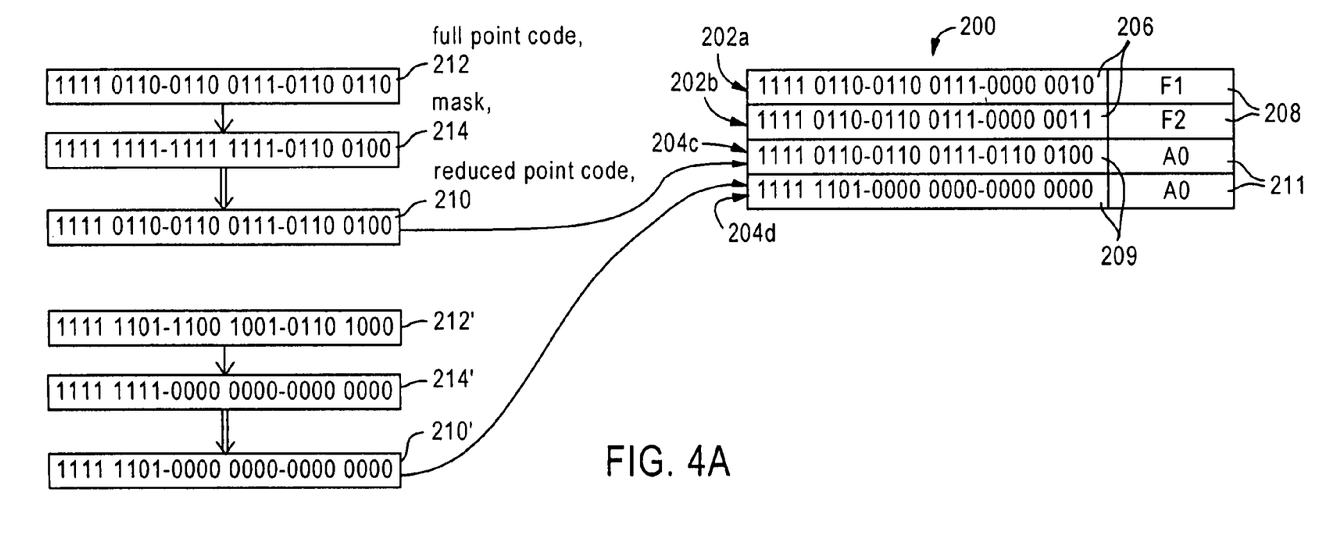
FIGS. 4A, 4B and 4C are diagrams illustrating routing tables for signaling nodes of FIG. 2 including reduced point code entries for summary routing according to an embodiment of the present invention.

In particular, assume the signaling node 114 (EO1) includes a routing table 200 illustrated in in FIG. 4A having a table entry 202. In particular, the routing table 200 includes a full point code entry 202a and 202b, and reduced point code entries 204c and 204d. The full length point code entry 202a includes a full length point code 206 and a prescribed route (i.e., linkset) 208. For example, the full length point code entry 202a specifies a full length point code of 246-103-002 that specifies the corresponding prescribed route 208 as link F1; similarly, the full length point code entry 202b specifies a full length point code 206 having a value of 246-103-003 and a corresponding prescribed route 208 of "F2". Hence, the signaling point 114, in response to receiving a signaling message having a destination point code of 246-103-002 would route the signaling message via the link "F1" to the end office EO2. Similarly, the signaling point 114 would route a signaling message having a destination point code of 246-103-003 to the signaling point AT1 via the F link "F2".

Figure 3:
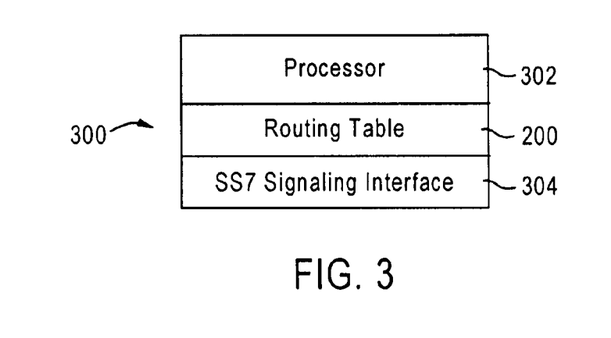
FIG. 3 is a diagram illustrating a signaling node of the signaling system of FIG. 2 according to an embodiment of the present invention.

Assume now that a designer wishes to separate signaling nodes in Region 1 based on the member octet value of the 9-digit point code. These design considerations can be readily implemented using summary routing in accordance with the disclosed embodiment. In particular, FIG. 3 illustrates in general a signaling node 300 having a processor 302, the routing table 200, and a signaling interface 304. As described below with respect to FIG. 4A, the processor 302, in response to determining the lack of a match during a full point code search, generates a reduced point code value 210 from the full length point code value 212 using a user selectable mask 214.

The simplest implementation of summary routing utilizes masks configured for masking contiguous bits, where a mask 214 having a value, e.g., of "1111 1111-1111 1111-1000 0000" can be used to distinguish between members in a group of signaling points having member octet values of 0 to 127 (decimal) and another group having member octet values 128 and above. Hence, a network designer can design groupings based on masking contiguous bits.

Masks also can be utilized for masking non-contiguous bits in order to group non-contiguous ranges of numbers. For example, the mask 214 illustrated in FIG. 4A having a value of "1111 1111-1111 1111-0110 0100" binary (i.e., 255-255-100 decimal) can be used to match the ranges of decimal values 100 to 103, 108 to 111, 116 to 119, etc.

Assume in FIG. 4A that a designer wishes to identify signaling nodes having a member octet values within the above-described decimal ranges 100 to 103, 108 to 111, 116 to 119, etc. for routing of signaling messages via an STP 141 or 142. Assume further that a designer wishes that all internetwork traffic between Region 1 and Region 2 must pass via an STP 141 or 142. For example, if the signaling point EO1 received a signaling message having a full length point code value 212 of "1111 0110-0110 0111-0110 0110" binary (i.e., 246-103-102 decimal) for the signaling point EO6, the processor 302 could apply a mask 214 previously specified by a user in order to obtain the reduced point code value 210 for searching the reduced point code entries 204.

As illustrated in FIG. 4A, the processor 302 applies the mask 214 in order to obtain the reduced point code value 210 of "1111 0110-0110 0111-0110 0100" binary (i.e., 246-103-100 decimal). Upon determining a match between the reduced point code 209 within the reduced point code entry 204c, the processor 302 of the signaling point 114 (EO1) utilizes the corresponding summary route 211 A-link "A0" to route the signaling message to the end office 119 (EO6) via the switching transfer point STP 2.

As described above, the mask 214 can mask non-contiguous bits of the full-length point code value. In this special case, the full point codes covered are in several non-contiguous decimal ranges 100-103, 108-111, 116-119, etc. Hence, network designers can represent new network hierarchies based on non-contiguous ranges as specified by the non-contiguous mask bits. In addition, a non-contiguous mask may be utilized as a lower-hierarchy mask following an unsuccessful summary route search using a contiguous mask search, described below with respect to step 528 of FIG. 5. As apparent from the foregoing, however, summary routing also may be utilized by masking contiguous bits of the full-length point code values, as illustrated below with reference to the masks 214' and 214".

As illustrated in FIG. 4A, all signaling messages destined for Region 2 having the network ID of 253 also are sent via the summary route 211, illustrated in FIG. 4A as linkset "A0". In particular, the summary route is identified by applying a mask 214' of "1111 1111-0000 0000-0000 0000" binary (i.e., 255-0-0 decimal) in the event that no full point code match has been found. As illustrated in FIG. 4A, applying the mask 214' to the full length point code value 212' of "1111 1101-1100 1001-0110 1000" binary (i.e., 253-201-104 decimal) by the processor 302 of the signaling point 114 (EO1) results in a reduced point code value 210' of "1111 1101-0000 0000-0000 0000" binary (i.e., 253-000-000 decimal). Hence, the processor 302, upon determining a match between the reduced point code value 210' and the reduced point code entry 204d, utilizes the corresponding summary route 211 ("A0") to route the signaling message to the signaling transfer point STP 2 for routing across a B-link to the network in Region 2.

Hence, summary routes can be used by network designers to more efficiently route signaling messages without the necessity of populating routing tables with numerous full length point codes.

Figure 4B:
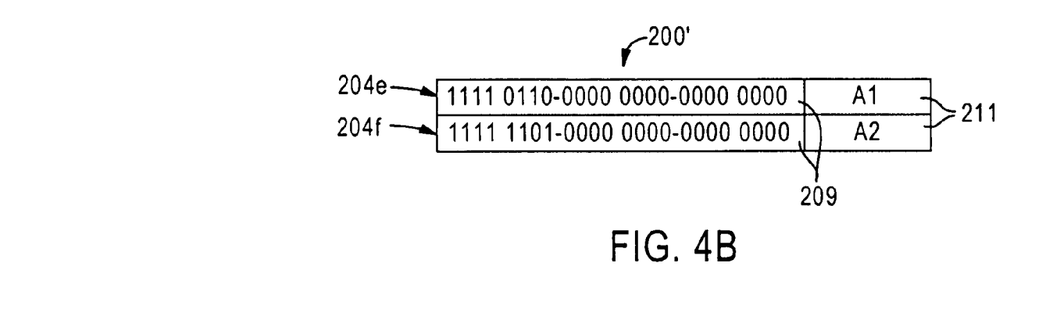

FIG. 4B illustrates a routing table 200' for the signaling point 140 ("AT2") configured so that signaling messages within the same network (network ID 253) are routed via the switching transfer point 146 (STP 4) using the link "A2", and internetwork traffic to the network having ID "246" is routed via the STP 144 via the "A1" link. In this case, the processor 302 for the SP 140 may apply the mask 214' having the value of "1111 1111-0000 0000-0000 0000" (i.e., 255-000-000 decimal) to identify the reduced point code entry 204e or 204f having the matching reduced point code 209.

Figure 4C:
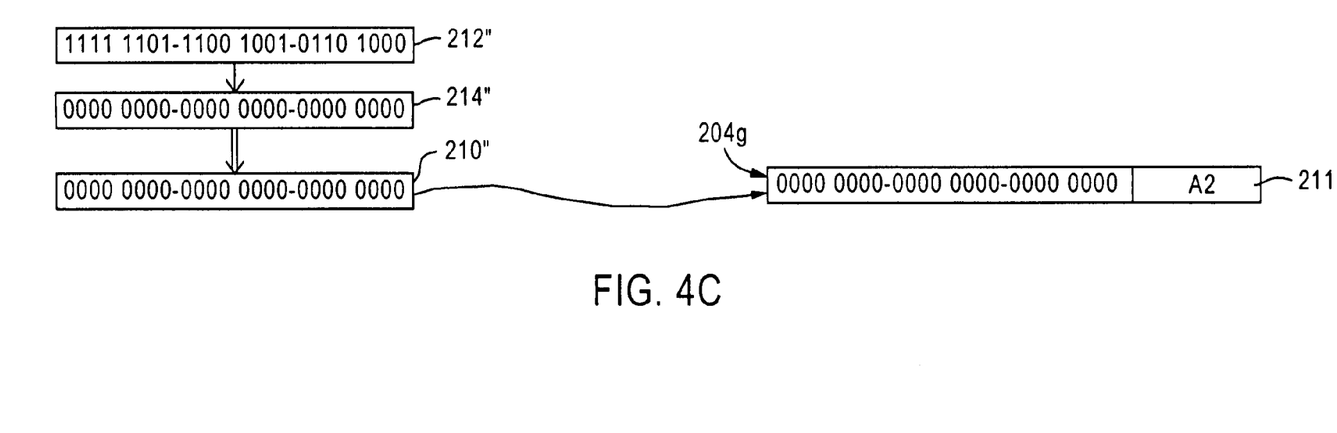

FIG. 4C is a diagram illustrating another example of using summary routes in the event of a failure of the link A1 between the SP 140 and the STP 144. As illustrated in FIG. 4C, the reduced point code entry 204g specifies a reduced point code 210" having a binary value of "0000 0000-0000 0000-0000 0000", which may be implemented by the SP 140 using a mask 214" having an all-zero binary value of "0000 0000-0000 0000-0000 0000", effectively zeroing out all destination point codes and causing all signaling traffic to be output on the summary route "A2". Such default routing may be particularly beneficial in the event of a failure in one of the STPs of a mated pair. Since the signaling point outputs the signaling messaging having the same valid point code, the STP 146 can properly determine the destination using the supplied full length point code information.

Figure 5:
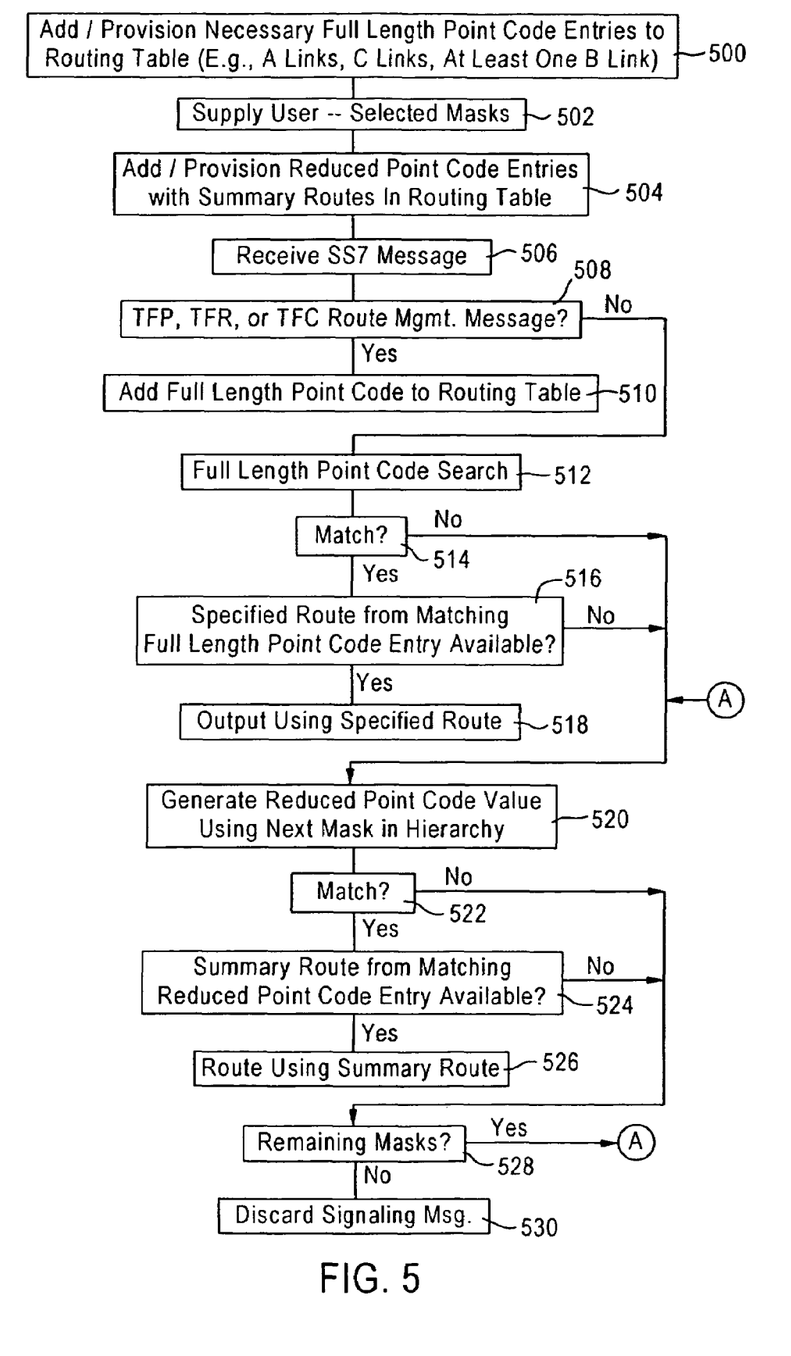
FIG. 5 is a diagram illustrating the method of performing summary routing by the signaling node of FIG. 3, according to an embodiment of the present invention.

FIG. 5 is a diagram illustrating the method of routing signaling messages using summary routing according to an embodiment of the present invention. The steps described in FIG. 3 can be implemented as executable code stored on a computer readable medium (e.g., a hard disk drive, a floppy drive, a random access memory, a read only memory, an EPROM, a compact disk, etc.).

The method begins in step 500, where the processor 302 adds/provisions any necessary full length point codes 202 into the routing table 200, for example any necessary A links, C links for mated pairs and at least one B link for internetwork signaling. The processor 302 then stores any user selected masks 214 in step 502, and provisions in step 504 the reduced point code entries 204 having the reduced point codes 209 and the summary routes 211. As described above, the value of the reduced point code entries 209 and the summary routes 211 are determined in conjunction with the selected masks during provisioning by a network designer.

The routing operation begins in step 506 with the signaling network node 300 receiving a message. The processor 302 of the signaling node 300 first checks in step 508 whether a full point code needs to be dynamically added, for example in response to a route management message. In particular, SS7 route management messages may be received that specify a condition of an SS7 route. For example, if the signaling network node 300 receives in step 508 a transfer prohibited (TFP) message, a transfer restricted (TFR) message, or a transfer controlled (TFC) message, a full length point code entry 202 reflecting the route management message is added to the routing table 200 by the processor 302 in step 510. Subsequently, if a message arrives for the destination specified in the route management message, the signaling network node 300 acts on the received message based on the received status specified in the dynamically added full point code entry; hence, the message may be dropped, or the sender may be notified of a restricted condition. Hence, the full length point code entry 202 serves as an overriding point code entry that has a higher priority than any reduced point code entry.

If dynamic generation of a full length point code is not needed for a route management message as described above with reference to step 508, the processor 302 executes in step 512 a full length point code search using the full length point code value from the received signaling message for searching the full length point code entries 202. As described above, the routing table 200 will only include the necessary number of full point code entries 202 (e.g., overriding point code entries), and hence will not be populated with a full set of possible full point code entries. If in step 514 the processor 302 determines a match between the full length point code value and one of the full length point code entries 202, the processor 302 checks whether the specified route from the matching full length point code entry 202 is available in step 516. If the specified route is available, the processor 302 outputs the signaling message in step 518 using the specified route.

As apparent from the foregoing, however, a substantial number of instances may occur where the full length point code search does not result in a match in step 514, or may result in the specified route being unavailable. In such cases, the processor 302 generates in step 520 a reduced point code value 210 using the appropriate mask 214 in the hierarchy of masks. In particular, the hierarchy of masks are arranged from most specific to least specific. Hence, a signaling node would apply the masks 214 as described in the following order: mask 214; mask 214'; mask 214". Hence, multiple summary routes can be implemented based on successively masking and searching using masks having successively greater masking results.

If in step 522 the processor 302 determines a match between the reduced point code value 210 and one of the reduced point code entries 204, the processor 302 checks in step 524 whether the corresponding summary route 211 from the matching reduced point code entry is available. If the corresponding summary route is available, the processor 302 routes the signaling message in step 526 using the summary route. Note that the signaling message is output with the same full length destination point code for use by the next signaling point.

If in step 522 there is no match, or if the summary route from the matching reduced point code entry is not available, the processor 302 checks in steps 528 if there are any remaining masks to be used in the hierarchy. If additional masks are available to continue the search, the processor 302 repeats step 520 to generate another point code value using the next mask in the hierarchy, for example by using the next mask on the first reduced point code value, or on the original full length point code. However, if there are no remaining masks then the signaling network node 300 discards the signaling message.

According to this disclosed embodiment, use of summary routes for these network designers to view some parts of their SS7 networks with arbitrary bit length. Hence, network devices can be easily administered and configured, and substantially reduces the memory requirements for the configuration of a routing table.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A signaling network node configured for routing a received signaling message having a point code field specifying a full-length point code value of a prescribed bit length, the signaling network node comprising:
    a routing table configured for storing reduced point code entries, each reduced point code entry configured for storing a corresponding reduced point code, having selected bits masked relative to a full-length point code of the prescribed bit length, and a corresponding summary route; and
    a processor configured for selecting one of the entries of the routing table for routing the received signaling message, the processor configured for selectively generating a reduced point code value based on a prescribed determined condition and based on applying a user-selectable mask to the full-length point code value, and selecting the one entry based on a match between the corresponding reduced point code and the reduced point code value.

2. The node of claim 1, wherein the routing table is further configured for storing full-length point code entries, each full-length point code entry configured for storing a corresponding full-length point code having the prescribed bit length and a corresponding prescribed route, the processor configured for selecting the one entry by initially searching for a full-length point code entry having the full-length point code value from the received signaling message.

3. The node of claim 2, wherein the reduced point code is generated based on determining, as the prescribed determined condition, an absence of the full-length point code value in the routing table.

4. The node of claim 2, wherein the reduced point code is generated based on determining, as the prescribed determined condition, an unavailable condition of the prescribed route corresponding to a full-length point code entry having the corresponding full-length point code matching the full-length point code value.

5. The node of claim 2, wherein the processor is configured for generating a second reduced point code value by applying a second user-selectable mask to one of the reduced point code value and the full-length point code value, for searching entries in the routing table having the selected bits masked relative to the second user-selectable mask, based on at least one of: a determined absence of a match of the reduced point code value in the routing table; and an unavailable condition of the summary route from the one entry matching the reduced point code value.

6. The node of claim 2, wherein the processor is configured for adding an overriding point code entry configured for storing a corresponding overriding point code having a higher priority than the reduced point code relative to the full-length point code and the corresponding user-selectable mask.

7. The node of claim 6, wherein the processor is configured for adding, as the overriding point code entry, a full-length point code entry in response to receiving a route management message specifying at least one of a transfer restriction, a transfer prohibition, and a transfer controlled for the corresponding full-length point code.

8. The node of claim 1, wherein the user-selectable mask is configured for masking any selected bit of the full-length point code value.

9. The node of claim 8, wherein the user-selectable mask is configured for masking all the bits of the full-length point code value.

10. The node of claim 8, wherein the user-selectable mask is configured for masking non-contiguous bits of the full-length point code value.

11. The node of claim 8, wherein the processor is configured for outputting the received signaling message maintaining the full-length point code value.

12. A method in a signaling network node for routing a received signaling message having a point code field specifying a full-length point code value of a prescribed bit length, the method including:

storing reduced point code entries in a routing table, each reduced point code entry configured for storing a corresponding reduced point code, having selected bits masked relative to a full-length point code of the prescribed bit length, and a corresponding summary route;

selectively generating a reduced point code value, based on a prescribed determined condition, based on applying a user-selectable mask to the full-length point code value; and selecting one of the entries of the routing table for routing the received signaling message, based on a match between the corresponding reduced point code and the reduced point code value.

13. The method of claim 12, wherein the routing table is further configured for storing full-length point code entries, each full-length point code entry configured for storing a corresponding full-length point code having the prescribed bit length and a corresponding prescribed route, the selecting step including initially searching the routing table using the full-length point code value from the received signaling message.

14. The method of claim 13, wherein the selectively generating step includes determining, as the prescribed determined condition, an absence of the full-length point code value in the routing table.

15. The method of claim 13, wherein the selectively generating step includes determining, as the prescribed determined condition, an unavailable condition of the prescribed route corresponding to a full-length point code entry having the corresponding full-length point code matching the full-length point code value.

16. The method of claim 13, wherein:

the selectively generating step includes generating a second reduced point code value by applying a second user-selectable mask to one of the reduced point code value and the full-length point code value, for searching entries in the routing table having the selected bits masked relative to the second user-selectable mask, based on at least one of: a determined absence of a match of the reduced point code value in the routing table; and an unavailable condition of the summary route from the one entry matching the reduced point code value; and the selecting step includes selecting the one entry based on a match between the corresponding reduced point code and the second reduced point code value.

17. The method of claim 13, further comprising adding an overriding point code entry configured for storing a corresponding overriding point code having a higher priority than the reduced point code relative to the full-length point code and the corresponding user-selectable mask.

18. The method of claim 17, wherein the adding step includes adding a full-length point code entry, as the overriding point code entry, in response to receiving a route management message specifying at least one of a transfer restriction, a transfer prohibition, and a transfer controlled for the corresponding full-length point code.

19. The method of claim 13, wherein the user-selectable mask is configured for masking any selected bit of the full-length point code value.

20. The method of claim 19, wherein the selectively generating step includes masking all the bits of the full-length point code value.

21. The method of claim 19, wherein the selectively generating step includes masking non-contiguous bits of the full-length point code value.

22. The method of claim 19, further comprising outputting the received signaling message maintaining the full-length point code value.

23. A computer readable medium having stored thereon sequences of instructions for forwarding a received message by a router, the sequences of instructions including instructions for performing the steps of:

storing reduced point code entries in a routing table, each reduced point code entry configured for storing a corresponding reduced point code, having selected bits masked relative to a full-length point code of the prescribed bit length, and a corresponding summary route;

selectively generating a reduced point code value, based on a prescribed determined condition, based on applying a user-selectable mask to the full-length point code value; and selecting one of the entries of the routing table for routing the received signaling message, based on a match between the corresponding reduced point code and the reduced point code value.

24. The medium of claim 23, wherein the routing table is further configured for storing full-length point code entries, each full-length point code entry configured for storing a corresponding full-length point code having the prescribed bit length and a corresponding prescribed route, the selecting step including initially searching the routing table using the full-length point code value from the received signaling message.

25. The medium of claim 24, wherein the selectively generating step includes determining, as the prescribed determined condition, an absence of the full-length point code value in the routing table.

26. The medium of claim 24, wherein the selectively generating step includes determining, as the prescribed determined condition, an unavailable condition of the prescribed route corresponding to a full-length point code entry having the corresponding full-length point code matching the full-length point code value.

27. The medium of claim 24, wherein:

the selectively generating step includes generating a second reduced point code value by applying a second user-selectable mask to one of the reduced point code value and the full-length point code value, for searching entries in the routing table having the selected bits masked relative to the second user-selectable mask, based on at least one of: a determined absence of a match of the reduced point code value in the routing table; and an unavailable condition of the summary route from the one entry matching the reduced point code value; and the selecting step includes selecting the one entry based on a match between the corresponding reduced point code and the second reduced point code value.

28. The medium of claim 24, further comprising instructions for performing the step of adding an overriding point code entry configured for storing a corresponding overriding point code having a higher priority than the reduced point code relative to the full-length point code and the corresponding user-selectable mask.

29. The medium of claim 28, wherein the adding step includes adding a full-length point code entry, as the overriding point code entry, in response to receiving a route management message specifying at least one of a transfer restriction, a transfer prohibition, and a transfer controlled for the corresponding full-length point code.

30. The medium of claim 24, wherein the user-selectable mask is configured for masking any selected bit of the full-length point code value.

31. The medium of claim 30, wherein the selectively generating step includes masking all the bits of the full-length point code value.

32. The medium of claim 30, wherein the selectively generating step includes masking non-contiguous bits of the full-length point code value.

33. The medium of claim 30, further comprising instructions for performing the step of outputting the received signaling message maintaining the full-length point code value.

34. A signaling network node configured for routing a received signaling message having a point code field specifying a full-length point code value of a prescribed bit length, the signaling network node comprising:
 means for storing reduced point code entries in a routing table, each reduced point code entry configured for storing a corresponding reduced point code, having selected bits masked relative to a full-length point code of the prescribed bit length, and a corresponding summary route;
 means for selectively generating a reduced point code value, based on a prescribed determined condition, based on applying a user-selectable mask to the full-length point code value; and
 means for selecting one of the entries of the routing table for routing the received signaling message, based on a match between the corresponding reduced point code and the reduced point code value.

35. The node of claim 34, wherein the routing table is further configured for storing full-length point code entries, each full-length point code entry configured for storing a corresponding full-length point code having the prescribed bit length and a corresponding prescribed route, the selecting means configured for initially searching the routing table using the full-length point code value from the received signaling message.

36. The node of claim 35, wherein the selectively generating means is configured for determining, as the prescribed determined condition, an absence of the full-length point code value in the routing table.

37. The node of claim 35, wherein the selectively generating means is configured for determining, as the prescribed determined condition, an unavailable condition of the prescribed route corresponding to a full-length point code entry having the corresponding full-length point code matching the full-length point code value.

38. The node of claim 35, wherein:
 the selectively generating means is configured for generating a second reduced point code value by applying a second user-selectable mask to one of the reduced point code value and the full-length point code value, for searching entries in the routing table having the selected bits masked relative to the second user-selectable mask, based on at least one of: a determined absence of a match of the reduced point code value in the routing table; and an unavailable condition of the summary route from the one entry matching the reduced point code value; and
 the selecting means is configured for selecting the one entry based on a match between the corresponding reduced point code and the second reduced point code value.

39. The node of claim 35, further comprising means for adding an overriding point code entry configured for storing a corresponding overriding point code having a higher priority than the reduced point code relative to the full-length point code and the corresponding user-selectable mask.

40. The node of claim 39, wherein the adding means is configured for adding a full-length point code entry, as the overriding point code entry, in response to receiving a route management message specifying at least one of a transfer restriction, a transfer prohibition, and a transfer controlled for the corresponding full-length point code.

41. The node of claim 35, wherein the user-selectable mask is configured for masking any selected bit of the full-length point code value.

42. The node of claim 41, wherein the selectively generating means is configured for masking all the bits of the full-length point code value.

43. The node of claim 41, wherein the selectively generating means is configured for masking non-contiguous bits of the full-length point code value.

44. The node of claim 41, further comprising means for outputting the received signaling message maintaining the full-length point code value.

* * * * *